March 20, 1956

S. C. ROCKAFELLOW 2,739,281

DEVICE FOR CONTROLLING THE RISE AND DECAY OF AN ELECTRIC CURRENT

Filed Oct. 26, 1951

INVENTOR.
STUART C. ROCKAFELLOW
BY

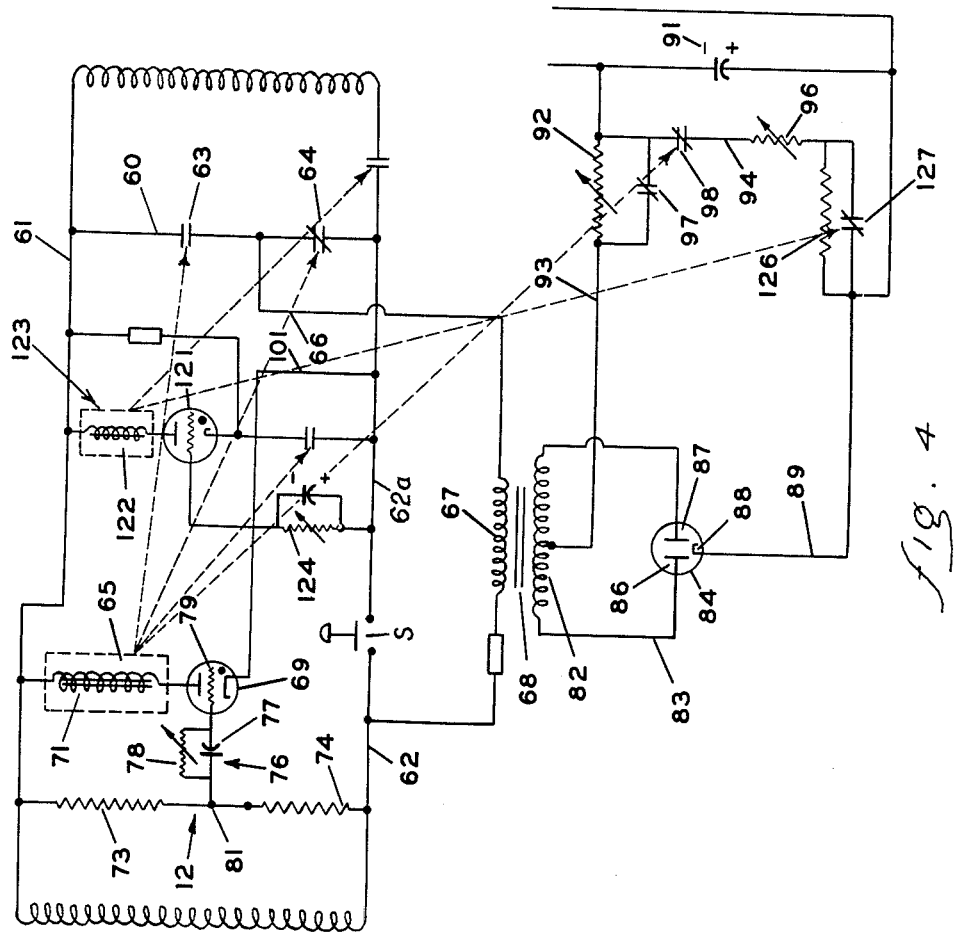

United States Patent Office 2,739,281
Patented Mar. 20, 1956

2,739,281

DEVICE FOR CONTROLLING THE RISE AND DECAY OF AN ELECTRIC CURRENT

Stuart C. Rockafellow, Farmington, Mich., assignor to Robotron Corporation, Detroit, Mich., a corporation of Michigan Application October 26, 1951, Serial No. 253,273

13 Claims. (Cl. 323—18)

This invention relates to a device for controlling the rise and decay of an electric current and relates particularly to such a device in which the rate of rise or the rate of decay of the current being controlled is a function of the rate of charging or the rate of discharging of a capacitor, or is a function of the rate of change of other source of D. C. potential. The invention is particularly applicable to electric welding controls and will be illustrated in terms thereof, but it will be recognized that other uses exist.

In the electric welding field it has long been known that it would be advantageous to supply current to the welding electrodes in such a manner as to build up heat in the work somewhat more gradually than is possible at present and, likewise, it would be desirable to cool electrodes somewhat more gradually than is practiced at present. Experimentation has shown that if the heat is built up in the electrodes at a gradual rate, a great deal less power is required than when it is applied suddenly, as is true in presently conventional practice.

While it has been customary in the practice of electric welding to provide what is termed "after heat," this has always involved a few cycles of time between the termination of the welding heat and the commencement of the after heat. Inasmuch as the electrodes cool rapidly, and are frequently cooled by water or other cooling liquid, the weld frequently chills during this period and, in spite of the annealing effect of the after heat, the weld is frequently brittle and, if the chilling has been too rapid, sometimes cracks open of its own accord.

I have discovered that by applying heat continuously to the weld but at a decreasing rate following the termination of the principal weld heat, it is possible to secure a highly ductile weld and one which is much more reliable than the welds that are secured by conventional practices.

Further, where the current is turned off suddenly, as in conventional practice, particularly where liquid cooled electrodes are used, the electrodes may cool more quickly than the material in the weld and therefore cause an undesirable local chilling of the weld. This often causes a weakened weld.

Actual experimentation with one specific embodiment of my invention herein utilized for illustrative purposes has shown that with the control of this invention a weld between given materials may be obtained by using a 50 kva. transformer which weld is in all respects of equal quality and strength with a weld applied by conventional practice from a 100 kva. transformer. Both the method of the present invention and that of conventional practice pass the same peak weld current but the peak duty cycle with the present method is considerably shorter, thus producing the same weld with less average power.

Accordingly, a principal object of the invention is to provide a process by which welding may be accomplished at substantially less power input than is involved in present conventional practice.

A further object of the invention has been to provide a method by which localized chilling of the weld during its cooling stage may be prevented.

A further object of the invention has been to provide a method for carrying out the foregoing named purposes which is capable of being practiced by a large number of different specific types of apparatus.

A further object of the invention has been to provide apparatus by which the foregoing named processes, or either of them, may advantageously be carried out.

A further object of the invention has been to provide apparatus by which the current supplied to welding electrodes may be built up gradually during a predetermined period of time requiring at least one cycle between the time that the current is turned on and the time it reaches its maximum value.

A further object of the invention has been to provide apparatus by which the decay of current between welding electrodes may be caused to extend over a period of at least one cycle between the time that the current is first reduced below its maximum value and the time it terminates altogether.

A further object of the invention is to provide apparatus, as aforesaid, which is relatively simple in construction.

A further object of the invention has been to provide apparatus, as aforesaid, which will be easy to operate and to maintain.

A further object of the invention has been to provide apparatus, as aforesaid, which will be reliable and sturdy.

A further object of the invention has been to provide apparatus, as aforesaid, which can be readily adjusted to effect different periods of both rise and decay of the current.

A further object of the invention has been to provide apparatus, as aforesaid, wherein said adjustments for rise and decay of the current may be made independently of each other and through a relatively wide range of time periods.

A further object of the invention has been to provide apparatus, as aforesaid, wherein either rise or decay of the current may be independently adjustable, the rise extending through a period of from one to five cycles and the decay from 3 to 30 cycles.

Other objects and purposes of the invention will become apparent to persons acquainted with apparatus of this general type upon reading of the following disclosure and inspection of the accompanying drawings.

In the drawings:

Figure 4 is a further circuit diagram showing a modification of the invention when more than one rate of rise is desired.

General description

In general, my invention, insofar as a general method of improving the weld is concerned, contemplates the building up of a welding current at a gradual rate, preferably over a period of from about one to about five cycles between the initial turning on of said current and the point of attainment of maximum current and it further contemplates a gradual decay of said current over a period of about 3 to about 30 cycles between the initial decrease in the value of said current and the complete termination thereof. One preferred specific method for carrying out this broad method is to phase shift the current effecting the conduction of the welding current ignitrons, and to utilize the rate of charging of a capacitor or the rate of decay of a capacitor to control said phase shift. One preferred apparatus for carrying out this method involves a capacitor-resistance type of phase shift circuit wherein changing the value of said resistance effects the desired shift in phase. Said apparatus also utilizes vacuum tubes in place of the conventional resistances and it employs a capacitor having its sides connected respectively to the control electrode and to the cathode of the vacuum tubes for varying the effective resistance placed in the phase shift circuit thereby. Means are provided for permitting the capacitor to discharge at a controlled rate from an initially charged condition and means are also provided for again charging the capacitor which charging may be after the elapsing of a predetermined period of time from the time of commencement of its said discharge.

*Detailed description*

While the method herein disclosed for effecting a weld is an important and vital part of the present invention, it has already been somewhat indicated and since it will be best understood if considered in connection with the operation of the apparatus herein disclosed, it will not be further described at this point. Reference is instead made to the description hereinafter appearing in relation to the operation of the device for the principal disclosure of my improved method of effecting a weld.

Figure 1:
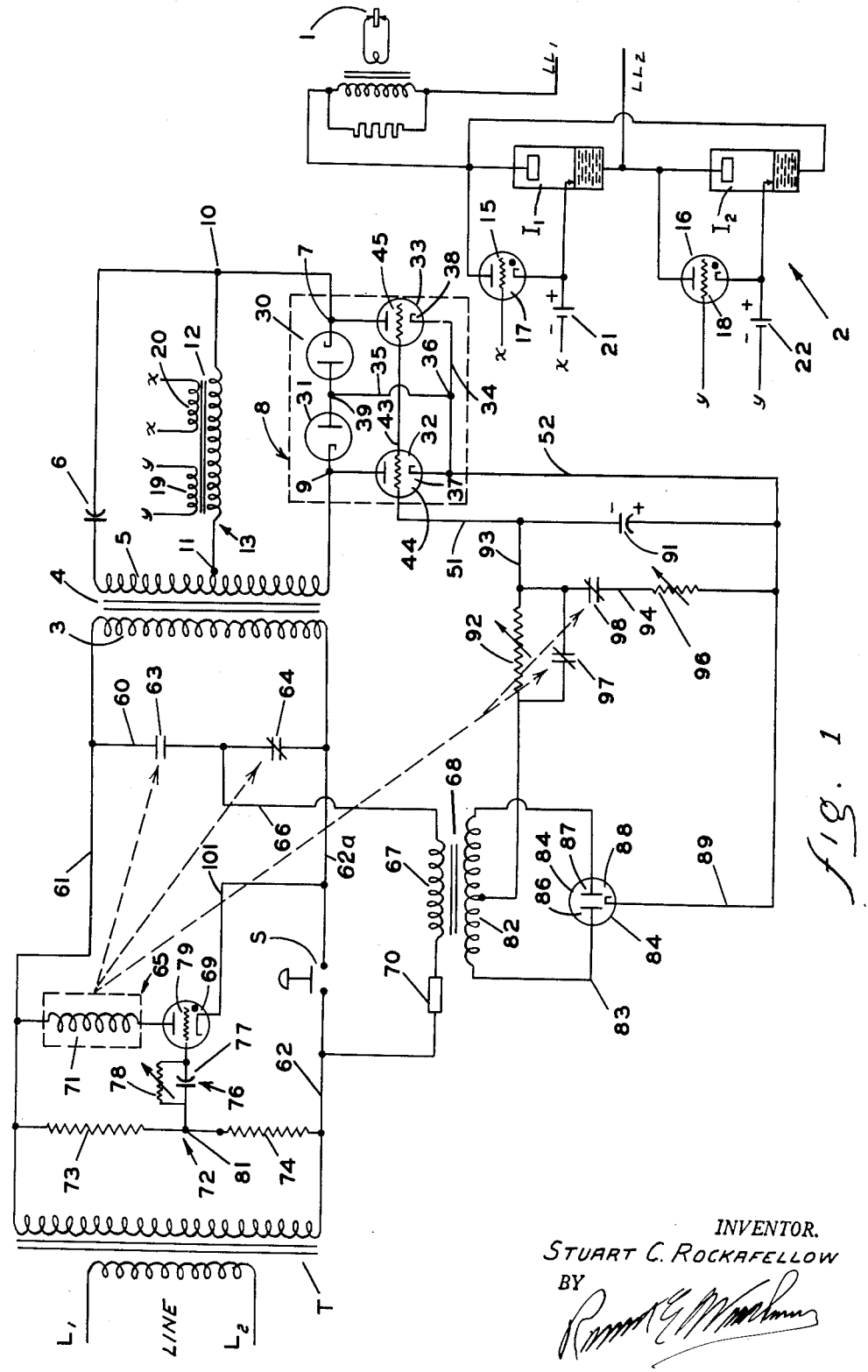
Figure 1 is a schematic diagram of one form of apparatus capable of carrying out the invention.

Referring now to the apparatus concerned, which has been primarily developed for carrying out my improved method of welding but which will also be applicable to a variety of other uses wherein it is desired to build up, decay, or both, a current at a gradual but predetermined rate, attention is first directed to Figure 1. The apparatus here illustrated is concerned solely with heat control and does not include means for effecting timing functions excepting as same are incident to the desired heat control. The apparatus is controlled by external timing means which are not shown here other than by designation of the contacts which are operated by said timing means to energize the heat control means herein shown.

The A. C. source is indicated by conductors L1 and L2 and the conductors LL1 and LL2. These conductors may be either connected to the same source or they may be connected to independent sources which are in a fixed phase relationship, as synchronism, with each other. The conductors L1 and L2 operate through a transformer T to energize same and thence to energize the transformer 4 through the conductors 61, 62 and 62a. The contacts S are controlled by the external timer to energize and deenergize the heat control circuit by connecting or disconnecting the adjacent ends of the conductors 62 and 62a.

The conductors LL1 and LL2 energize the load 1 through the switch circuit 2.

The phase shifting apparatus, and its connection to the welding current ignitrons, is shown in detail in my co-pending application Serial No. 210,922, now abandoned, and reference is made thereto for a detailed disclosure of this structure and operation of said apparatus. However, for convenience in reference, a brief description thereof will be given here.

One side of the secondary winding 5 of the transformer 4 is connected to a capacitor 6 and it in turn is connected to one terminal 7 of the variable resistor circuit 8. The other terminal 9 of said circuit 8 is connected to the other side of said secondary winding 5. A terminal 10, located between the capacitor 6 and the variable resistor circuit 8, constitutes one output terminal of the phase shift circuit, and the terminal 11, connected to a center tap on the secondary winding 5, constitutes the other output terminal of said phase shift circuit. In this instance the primary winding 12 of a transformer 13 is connected between said output terminals 10 and 11 as the load of said phase shift circuit.

In the switch circuit 2 there may be provided any desired apparatus. The particular apparatus here shown is illustrated and claimed in my co-pending applications, now U. S. Patent No. 2,605,448, granted July 29, 1952 and Serial No. 210,922, now abandoned, but will be described briefly here for purpose of convenient reference. The ignitrons $I_1$ and $I_2$ are connected in the load circuit in a conventional back-to-back, parallel arrangement. Their conduction is controlled by the thyratrons 15 and 16, each thyratron being connected in the anode to igniter circuits of their respective ignitrons. Each of the thyratron grids 17 and 18, respectively, is connected in series to the two secondary windings 19 and 20, respectively, of the transformer 13, thence through sources 21 and 22, respectively, of constant potential to the respective cathodes of said thyratrons. Thus, a constant D. C. bias for normally blocking conduction through said thyratrons is placed onto each of said grids, which bias is overcome alternatively by potentials appearing on the secondary windings 19 and 20 sufficiently to effect the firing of the respective thyratrons.

The variable current control circuit 8 comprises the rectifiers 30 and 31 which are connected in series with each other and with the terminals 7 and 9. Their respective positive terminals or anodes are connected to each other and their negative terminals or cathodes are connected, respectively, to the terminals 7 and 9. In the specific embodiment here illustrated, conventional vacuum diodes are utilized although other conventional rectifiers may be used such as those of the dry-disk, or selenium, type. Vacuum tubes 32 and 33 are provided and have their respective anodes connected to the terminals 7 and 9. The cathodes of said vacuum tubes are connected to each other by the conductor 34 and a conductor 35 connects the point 36 intermediate said cathodes 37 and 38 to a point 39 on the conductor between said two rectifiers.

One side of the hereinafter described control capacitor 91 is connected by the conductor 52 to said conductor 34 connecting the cathodes of said vacuum tubes. The other side of said capacitor 91 is connected by the conductors 51 and 43 to both of the grids 44 and 45 of said vacuum tubes.

Control over the potential imposed upon the control electrodes 44 and 45 of the vacuum tubes 32 and 33 will effect a shift in phase of the alternating currents supplied at the terminals 10 and 11 with respect to the input of the transformer 4 in the manner detailed by my application Serial No. 210,922.

Turning now to the apparatus by which the said vacuum tubes may be controlled, a conductor 60 extends between the conductor 61 and conductor 62a and has interposed in series therein the contacts 63 and 64 of the relay 65. A further conductor 66 connects at its one end with the conductor 60 intermediate said relay contacts and connects at its other end to one end of the primary winding 67 of the transformer 68. The other end of said primary winding 67 connects to the conductor 62 through a small resistor 70.

The transformer 68 has a primary winding 67 of fairly high impedance, as 3 or 4 to 1 under similar load conditions, with respect to primary winding 3 of transformer 4 so that when winding 67 is connected in series with winding 3 of transformer 4 as hereinafter described, the voltage drop across winding 3 of transformer 4 is low enough to prevent the switch circuit 2 from firing when the apparatus is in an at rest position as further described hereinafter. The resistor 70 is inserted to provide further assurance against excessive voltage appearing across the said winding 3 when the apparatus is in at rest condition.

A thyratron 69 is connected by its anode through the winding 71 of the relay 65 to the conductor 61, and is connected by its cathode directly to the conductor 62a. A voltage divider 72 comprising the series connected resistances 73 and 74 is connected between the conductor 61 and the conductor 62. The time constant circuit 76 comprising the capacitor 77 and the variable resistor 78 is connected at its one end to the control electrode 79 of the thyratron 69 and is connected at its other end to said voltage divider circuit at a point 81 intermediate the said resistors thereof.

The secondary winding 82 of the transformer 68 is connected at its one end by the conductor 83 to one anode 86 of the two-anode rectifier 84 and is connected at its other end to the other anode 87 thereof. The cathode 88 of said rectifier is then connected by the conductor 89 to one side of the control capacitor 91. The other side of said control capacitor 91 is connected through the decay control variable resistor 92 by the conductor 93 to the center of the secondary winding 82. A further conductor 94 including the rise control variable resistor 96 is connected between the conductor 89 and a point on the conductor 93 between said control capacitor 91 and the decay control variable resistor 92. Contacts 97 of the relay 65 are normally closed and shunt the decay control variable resistor 92, and contacts 98 of the relay 65 are normally closed and are in series with the rise control variable resistor 96.

*Operation*

Although the method herein disclosed will be best understood, and accordingly will be disclosed, by a discussion of the operation of the foregoing apparatus, it will be apparent to those acquainted with equipment of this general type that the method herein set forth may be effected by a wide variety of other specific items of apparatus and said steps are accordingly not limited thereto. The method is disclosed in terms of the operation of the apparatus herein set forth solely as a matter of convenience and clarity.

In what may be termed the "at rest" position of the present apparatus, that is, during the "off" period of the welding heat as determined by the timing device which may be of any conventional sort, such as that disclosed in my United States Patent No. 2,573,360, granted October 30, 1951, the switch contacts S will be open. The line voltage will energize the primary winding of the transformer T and the secondary winding of said transformer will energize the primary winding of the transformer 4 through the conductor 61 on its one side and the conductors 62 and 62a on its other side which latter acts through the conductor 66 and the normally closed contacts 64. This energizes the secondary winding 5 of the transformer 4 but such energization is held by the resistor 70 and the high impedance of the primary winding 67 as compared to the impedance of the primary winding 3 to a sufficiently low level that the blocking of the switch circuit 2 by the bias provided therein will not be overcome. Thus, while the secondary winding 5 is in fact energized during the at rest condition of the apparatus, such energization is at a sufficiently low level that the switch circuit remains non-conductive.

With current flowing in the conductor 66, as aforesaid, the primary winding 67 of the transformer 68 will be energized and the secondary winding 82 of the same transformer will also be accordingly energized. This acts through the rectifier 84 to charge the control capacitor 91. The control capacitor will tend to drain out through the variable resistor 96 during low points in the A. C. cycle, but inasmuch as it is being charged on both cycles of the supply, the drain will be of small account and the capacitor 91 will be rapidly brought to its full charge. Thus, at the end of the "off" period said capacitor will be fully charged and will remain so.

When the weld heat is desired, as at the end of the electrode closing step, the external timer will close the contacts S and hold same closed throughout all of the hereinafter mentioned steps.

Voltage from transformer T is now placed directly onto the primary winding 3 of transformer 4. However, the charge of said capacitor 91, being now at full strength is placed on the control electrodes of the vacuum tubes 32 and 33. The phase of the output of the phase shift circuit will be such that its output will not overcome the bias of the thyratrons 15 and 16. Thus, the switch circuit 2 still does not conduct and no power will yet be supplied to the welding electrodes.

When the contacts S are closed this will short out the primary winding of the transformer 68 and will terminate the charging current for the capacitor 91. Said capacitor now discharges through the variable resistor 96 and in so doing reduces the potential applied to the control electrodes of the vacuum tubes 32 and 33. This then, so alters the resistance placed into the phase shift circuit by said vacuum tubes, in the manner set forth in detail in my copending application Serial No. 210,922, that the phase of the output thereof will shift with respect to the phase of the line voltage in such a direction and to such an extent that the thyratrons 15 and 16 will commence to conduct during small portions of the pulses of line voltage applied thereto. This, as also set forth in said application Serial No. 210,922, will permit small pulses to commence flowing through the ignitrons and through the welding electrodes. As the capacitor 91 further discharges and the potential on the control electrodes 44 and 45 of the vacuum tubes further decreases, the pulses so passed through the switch circuit 2 and applied to the welding electrodes will increase. Thus, the heat applied to the work will rise at a rate accurately controllable by the setting of the variable resistor 96. Normally, said variable resistor will be set in such a manner as to permit the rise to full heat to take place in from 1 to 5 cycles, although this is a matter of choice and is mentioned as illustrative only and should not be taken as limiting.

Now turning to the decay portion of the cycle, and referring again back to the "at rest" position with contacts S open, pulses will pass through the conductor 101 and will go from the cathode to the grid of the thyratron 69 and from thence through the variable resistor 78 and the resistor 74 to the conductor 62. This will charge the timing capacitor 77 to a level determined by the setting of said variable resistor 78.

Figure 2:
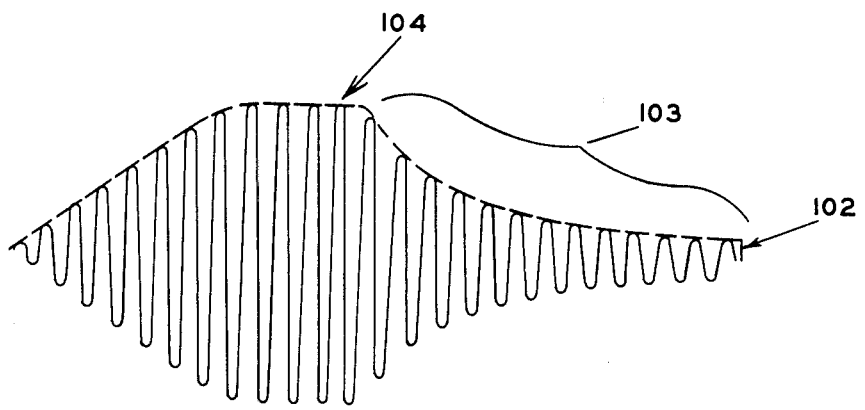
Figure 2 is a graph showing diagrammatically a typical current pattern to the primary winding of the welding transformer effected by the method and apparatus of the invention.

With the closing of the contacts S, the thyratron is shorted and the charging of the capacitor 77 by cathode to grid conduction through said thyratron will terminate. Thus, said timing capacitor will commence discharging through the resistance 78 but will hold the said thyratron blocked until it discharges to a predetermined level. So long as said thyratron remains non-conductive the control capacitor 91 will remain discharged and the energy supplied to the welding electrodes will remain at full heat. However, as soon as said thyratron 69 conducts, the winding 71 of the relay 65 will become energized and the contacts 64 and 98 and 97 will open and the contacts 63 will close. This again effects energization of the transformer 68 and through it a charging potential is again applied to the control capacitor 91. However, inasmuch as said charging potential must also pass through the decay variable resistor 92, contacts 97 now being open, said charging will occur at a rate controlled by the setting of said decay variable resistor. Thus, the said capacitor becomes recharged at a definitely controllable rate and, as it does so, it applies a potential to the control electrodes of the vacuum tubes 32 and 33 at the same rate. This again effects a phase shift and reduces the heat applied to the welding electrodes at a rate corresponding to the rate at which the said control capacitor 91 becomes charged, as indicated by zone 103 of the broken line 104 in Figure 2. The external timer will then open the contacts S at a point indicated in Figure 2 by the line 102 and the welding heat will terminate.

The apparatus has now returned to "at rest" condition, the capacitor is fully charged, and the equipment is ready to start a new cycle as soon as the contacts S are again closed by the external timer.

Modifications

Figure 3:
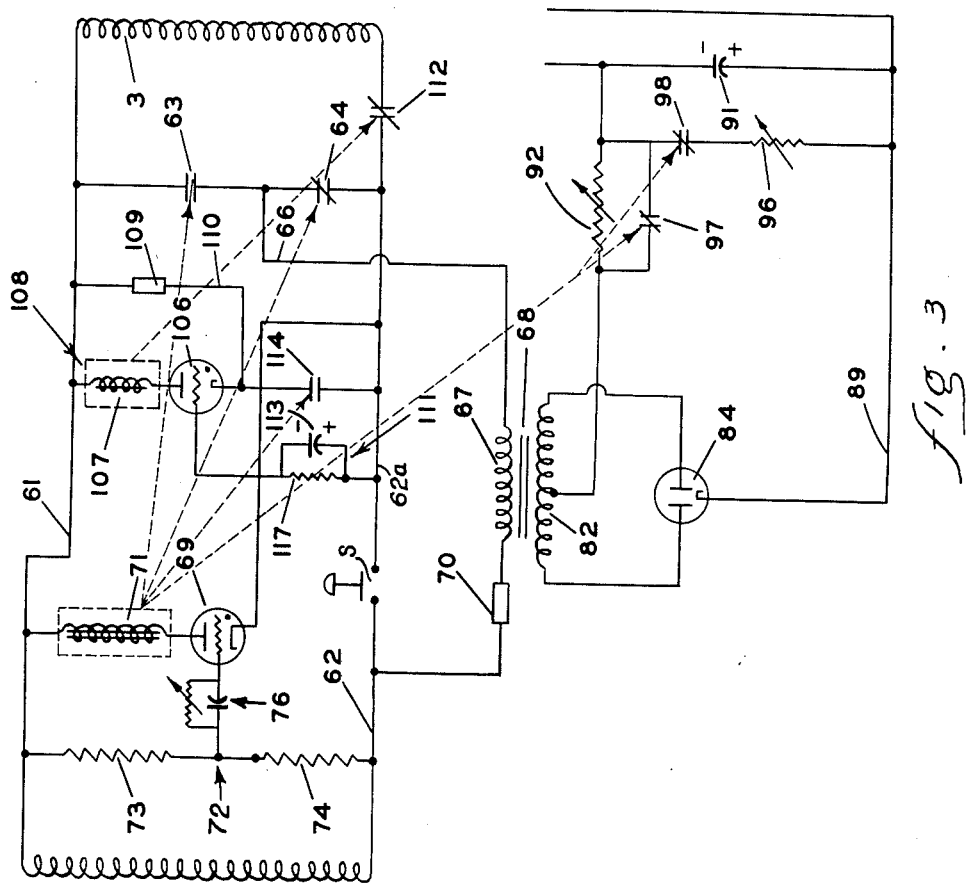
Figure 3 is a circuit diagram showing a modification effecting current termination independent of the external timing means.

In Figure 3 there is illustrated a modification of the above described apparatus which provides for complete cut off of the welding current independently of the external timer.

This apparatus is largely identical in structure and function with that above described in connection with Figure 1 and corresponding numerals indicate corresponding parts. Hence its description here will be limited only to the parts thereof that are added.

In this circuit there is provided a second thyratron 106 whose cathode is connected to the conductor 62a and whose anode is connected through a winding 107 of the relay 108 to the conductor 61. A conductor 110 with a high resistance 109 is connected from the conductor 61 to the cathode of said thyratron, and the control electrode of said thyratron is connected through a time-constant circuit 111 to the conductor 62a. The normally closed contacts 112 of said relay 108 are in the conductor 62a. The normally open contacts 114 are closed upon energizing of the relay winding 71.

When this apparatus is in its "at rest" position, the timing capacitor 113 charges by cathode to grid conduction and when the contacts 114 closed upon the energizing of the relay winding 71 the potential on the thyratron is reversed. The potential on the capacitor 113 holds the thyratron 106 blocked in the usual manner and said potential discharges through the resistance 117. The apparatus is so arranged that the thyratron 106 becomes conductive at the point at which it is desired to terminate the welding heat completely, namely that point indicated by the line 102 appearing in Figure 2, whereupon as the thyratron conducts it energizes the relay 108 and opens the normally closed contacts 112. This, then, terminates the supply of energy to the phase shift circuit and thereby terminates the welding heat entirely even though the contacts S under the control of the external timer, are still closed.

Accordingly, this provides for supplemental timing within this circuit which is sometimes convenient in circumstances where the termination of welding heat from an external timer as set forth above in connection with Figure 1 is not feasible.

Looking now at Figure 4, there is shown means by which a plurality of exponential functions may be employed in the discharging of the control capacitor 91 and the rate of rise of the welding heat be controlled accordingly.

A thyratron 121 is provided between the conductors 61 and 62a and is connected thereto in the same manner as the thyratron 106 shown in Figure 3, and is arranged to energize the winding 122 of the relay 123 upon the expiration of the predetermined time selected according to the setting of a variable resistor 124. A further resistance 126, which may or may not be adjustable in value, is provided in series with the variable resistor 96. The normally closed contacts 127 of the relay 123 are placed in shunt around said resistor 126.

Thus, with the contacts 127 closed, the capacitor 91 will discharge through the variable resistor 96 at a rate determined thereby. After expiration of a predetermined amount of time, such as two cycles after the closing of the contacts S by the external timer, the thyratron 121 will conduct causing the energization of the relay winding 122 and the opening of the contacts 127. Now the capacitor must discharge through both the variable resistor 96 and the resistor 126 and it will be apparent that said discharge will be at a different rate.

Alternatively, the contacts 127 may be normally open so that the capacitor 91 initially discharges through both of said resistors and upon the energization of the thyratron 121 the contacts 127 will close and the discharge is then through only the variable resistor 96.

In this way it will be evident that a wide variety of heat rise patterns may be provided.

Figure 5:
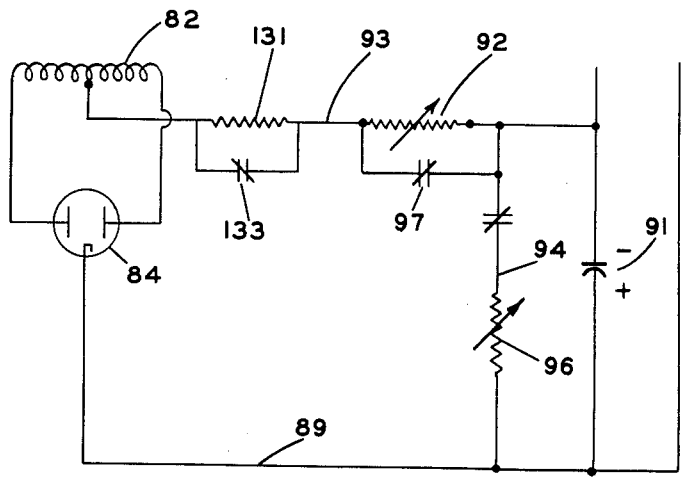
Figure 5 is a further circuit diagram showing a modification of the invention when more than one rate of decay is desired.

A still further alternative is shown in Figure 5 and utilizes the circuit associated with the thyratron 121 but here the relay controlled thereby will control the normally closed contacts 133 which are in shunt around a resistor 131, which resistor is placed in series with the variable resistor 92. Said thyratron 121 becomes conductive a predetermined period of time following the closing of the contacts 63 and the consequent commencement of recharging of the capacitor 91 through the variable resistor 92. With the opening of said normally closed contacts 133, the resistor 131 is added to the circuit through which said capacitor charges and the rate of its charging is altered in a manner determined by the value of said resistor 131.

Alternatively, the contacts 133 may be normally open so that energization of the relay 123 will close said contacts and remove the resistor 131 from the charging circuit of the capacitor 91.

In this way, it will be apparent that a wide variety of current decay patterns may be provided for the welding heat.

While the foregoing described apparatus has throughout assumed for illustrative purposes the employment of a capacitor resistor type of phase shift circuit, it will be recognized in the light of the foregoing that any phase shift circuit may be utilized wherein a change in the charge on a capacitor may be utilized to effect a phase shift.

The foregoing several specific embodiments of my invention are selected to illustrate both the process of the invention, and several items of apparatus by which said process may be practiced. It will be recognized, however, by those acquainted with processes and apparatus of this general sort that other variations are possible in both the method and apparatus herein disclosed. All of said variations will be included within the scope of my hereinafter appended claims excepting as such claims by their terms expressly limit otherwise.

I claim:

1. In a device for controlling the electric energy supplied to a load circuit, the combination comprising: first and second terminals connectible to a source of alternating power potential and means including a pair of back-to-back connected ignitrons connecting said terminals with said load circuit; a pair of thyratrons and means connecting each of said thyratrons respectively in the igniter circuits of each of said ignitrons; means connectible to a source of alternating control potential and a phase shift circuit energized therefrom; said phase shift circuit including a resistance circuit responsive in magnitude of effective resistance to the magnitude of a D. C. potential supplied thereto; means connecting said phase shift circuit between the control electrode and the cathode respectively of each of said thyratrons for controlling the conductivity thereof, said thyratrons being normally biased into non-conductive conditions; a capacitor and a resistor shunting said capacitor, and means connecting said capacitor to said resistance circuit for supplying said D. C. potential to said resistance circuit; a charging circuit connected to said source of alternating control potential and including a rectifier for normally charging said capacitor; means de-energizing said charging circuit simultaneously with placement of energizing potential onto said phase shift circuit.

2. Apparatus defined in claim 1 including also a time delay circuit including the winding of a relay, the contacts of said relay arranged to re-energize said charging circuit and open said shunt circuit at a predetermined period of time following the said energizing of said phase shift circuit.

3. In a device for controlling the electric energy supplied to a load circuit, the combination comprising: first and second terminals connectible to a source of alternating power potential and means including a pair of back-to-back connected ignitrons connecting said terminals with said load circuit; a pair of thyratrons and means connecting each of said thyratrons respectively in the igniter circuits of each of said ignitrons; means connectible to a source of alternating control potential and a phase shift circuit energized therefrom; said phase shift circuit including a resistance circuit responsive in magnitude of effective resistance to the magnitude of a D. C. potential supplied thereto; means connecting said phase shift circuit between the control electrode and the cathode respectively of each of said thyratrons for controlling the conductivity thereof, said thyratrons being normally biased into non-conductive conditions; a capacitor and a first resistor shunting said capacitor, and means connecting said capacitor to said resistance circuit for supplying said D. C. potential thereto; a charging means energized from said source of control alternating potential providing a source of D. C. potential and conductors connecting one side of said charging means to one side of said capacitor and connecting the other side of said charging means through a second resistor to the other side of said capacitor; a relay having a plurality of contacts, one thereof being normally closed and shunting said second resistor and another thereof being normally closed and in series with said first resistor; means de-energizing said charging means simultaneously with placement of energizing potential onto said phase shift circuit.

4. In a device for controlling the electric energy supplied to a load circuit including an external timer, the combination comprising: first and second terminals connectible to a source of alternating power potential and means including a pair of back-to-back connected ignitrons connecting said terminals with said load circuit; a pair of thyratrons and means connecting each of said thyratrons respectively in the igniter circuits of each of said ignitrons; means connectible to a source of alternating control potential and a phase shift circuit energized therefrom; said phase shift circuit including a resistance circuit responsive in magnitude of effective resistance to the magnitude of a D. C. potential supplied thereto; means connecting said phase shift circuit between the control electrode and the cathode respectively of each of said thyratrons for controlling the conductivity thereof, said thyratrons being normally biased into non-conductive conditions; a capacitor and a resistor shunting said capacitor, and means connecting said capacitor to said resistance circuit for supplying said D. C. potential thereto; means including the contacts of said external timer connecting said source of alternating control potential for energizing said phase shift circuit; a charging circuit connected around said external timer contacts and including means for supplying a D. C. charging potential to said capacitor; a relay including a plurality of contacts one being normally closed and interposed in series with said resistor and another being normally closed and interposed in series with said charging circuit; and a third thereof being normally opened and connecting one end of said charging circuit for shunting said phase shift circuit; a voltage divider connected across said source of alternating control potential and including a pair of series connected resistances; a thyratron and means connecting the grid thereof through a time constant circuit intermediate said voltage divider resistances and other means connecting the cathode thereof to a point intermediate said external timer contacts and the adjacently connected side of said phase shift circuit; other means connecting the anode thereof through the winding of said relay to the second side of said alternating control potential.

5. In a device for supplying an electrical current to a load circuit, the combination comprising: a source of alternating power potential and a source of alternating control potential; means supplying said alternating power potential to said load circuit for a predetermined period of time; means progressively shifting the phase of said alternating control potential with respect to said alternating power potential; said phase shifting means including a pair of vacuum tubes constituting resistance elements wherein maximum resistance results in maximum phase shift and a minimum supply of power to the load circuit, and means including a capacitor for imposing a control voltage onto the control electrodes of said vacuum tubes; means effecting discharge of said capacitor prior to the commencement of the period of maximum energy supplied to said load circuit and means operative at the termination of said period effecting charging of said capacitor at a predeterminable rate, whereby to shift the phase of the alternating control voltage at a predetermined rate and thereby to progressively decrease the current supplied to the load circuit at a predeterminable rate.

6. In a device for controlling electrical energy supplied to a load circuit the combination comprising: first and second terminals connectible to a source of alternating power potential and means including translating means connecting said terminals with said load circuit; a pair of grid controlled space discharge devices and means connecting each thereof, respectively, for controlling the conductivity of each of said translating devices; a phase shift circuit and means connectible to a source of alternating control potential for energizing said phase shift circuit, said phase shift circuit including a resistance circuit responsive in magnitude of effective resistance to the magnitude of D. C. potential provided thereto; means connecting said phase shift circuit in the grid circuit of each of said space discharge devices for controlling the conductivity thereof, said space discharge devices being normally biased into non-conductive condition; a capacitor and a resistor in shunt with said capacitor and means connecting said capacitor to said resistance circuit for supplying said D. C. potential thereto, a charging circuit connecting to said source of alternating control potential for normally charging said capacitor; means deenergizing said charging circuit in a predetermined timed relationship with the placement of an energizing potential onto said phase shift circuit.

7. In a device for supplying electrical current to a load circuit, the combination comprising: a source of alternating power potential and a source of alternating control potential; means supplying said alternating power potential to said load circuit for a predetermined period of time; means progressively shifting the phase of the alternating control potential with respect to said alternating power potential, said phase shifting means including a resistance element the magnitude of whose effective resistance is responsive to the magnitude of a D. C. potential supplied thereto; and wherein maximum resistance results in maximum phase shift and a minimum supply of energy to the load circuit; means including a capacitor for imposing a control voltage onto said resistance element; means effecting commencement of discharge of said capacitor prior to the commencement of a period during which energy is supplied to said load circuit; a charging circuit connected to a source of alternating potential for normally charging said capacitor and means deenergizing said charging circuit in a predetermined time relationship with the placement of an energizing potential onto said phase shifting means.

8. The combination of claim 7 including a resistance line in shunt with said capacitor, said resistance line including first and second series connected resistances; a relay, said relay having contacts connected in shunt around the second of said resistances; means for actuating said relay and thereby changing the setting of said contacts in timed relationship with the placement of an energizing potential onto said phase shifting means.

9. In a device for supplying electrical current to a load circuit, the combination comprising: a source of alternating power potential and a source of alternating control potential; means supplying said alternating power potential to said load circuit for a predetermined period of time; means progressively shifting the phase of the alternating control potential with respect to said alternating power potential, said phase shifting means including a resistance element the magnitude of which effective resistance is responsive to the magnitude of a D. C. potential supplied thereto; and wherein maximum resistance results in maximum phase shift and a minimum supply of energy to the load circuit; means including a capacitor for imposing a control voltage onto said resistance element; means effecting commencement of discharge of said capacitor prior to the commencement of a period during which energy is supplied to said load circuit; a charging means energized from said source of alternating control potential providing a source of D. C. potential and conductors connecting one side of said charging means to one side of said capacitor and connecting the other side of said charging means through a second resistor to the other side of said capacitor; a relay having a plurality of contacts, one thereof being normally closed and shunting said second resistor and another thereof being normally closed and in series with said first resistor; means deenergizing said charging means simultaneously with placement of energizing potential onto said phase shift circuit.

10. The combination of claim 9 and including a second relay having a set of normally closed contacts in series with said phase shift circuit and means for opening said contacts and de-energizing said phase shift circuit a predetermined period of time after the energization thereof.

11. In a device for supplying electrical current to a load circuit in association with an external timer, the combination comprising: a source of alternating power potential and a source of alternating control potential; means supplying said alternating power potential to said load circuit for a predetermined period of time; means progressively shifting the phase of the alternating control potential with respect to said alternating power potential, said phase shifting means including a resistance element the magnitude of whose effective resistance is responsive to magnitude of D. C. potential supplied thereto; and wherein maximum resistance results in maximum phase shift and a minimum supply of energy to the load circuit; means including a capacitor for imposing a control voltage onto said resistance element; means effecting commencement of discharge of said capacitor prior to the commencement of a period during which energy is supplied to said load circuit; a charging circuit connected around the contacts of said external timer and including means for supplying a D. C. charging potential to said capacitor; a relay including a plurality of contacts, one being normally closed and interposed in series with said resistor and another being normally closed and interposed in series with said charging circuit; and a third thereof being normally open and connecting one end of said charging circuit for shunting said phase shift circuit; a voltage divider connected across said source of alternating control potential and including a pair of series connected resistances; a thyratron and means connecting the grid thereof through a time constant circuit to a point intermediate said voltage divider resistances and other means connecting the cathode thereof to a point intermediate said external timer contacts and the adjacently connected side of said phase shift circuit; other means connecting the anode thereof through the winding of said relay to the second side of said alternating control potential.

12. In a device for supplying an electrical current to a load circuit, the combination comprising: a source of alternating power potential and a source of alternating control potential; means supplying said alternating power potential to said load circuit for a predetermined period of time; means progressively shifting the phase of said alternating control potential with respect to said alternating power potential; phase shifting means including a resistance element the magnitude of whose effective resistance is responsive to the magnitude of D. C. potential supplied thereto and wherein maximum resistance results in maximum phase shift and in a minimum supply of power to the load circuit, and means including a capacitor for imposing a D. C. potential as a control voltage onto said resistance element; means effecting discharge of said capacitor at a predeterminable rate prior to the commencement of the period of maximum energy supplied to said load circuit and means operative at the termination of said period effecting charging of said capacitor at a predeterminable rate, whereby to shift the phase of the alternating control voltage at a predetermined rate and thereby to progressively decrease the current supplied to the load circuit at a predeterminable rate.

13. In a device for controlling electrical energy supplied to the load circuit the combination comprising: first and second terminals connectible to a source of alternating power potential and means including translating means connecting said terminals with said load circuit; a pair of grid controlled space discharge devices and means connecting each thereof, respectively, for controlling the conductivity of each of said translating means; a phase shift circuit and means connectible to a source of alternating control potential for energizing said phase shift circuit, said phase shift circuit including a resistance circuit responsive in magnitude of effective resistance to the magnitude of the D. C. potential provided thereto; means connecting said phase shift circuit in the grid circuit of each of said spaced discharge devices for controlling the conductivity thereof, said space discharge devices being normally biased into non-conductive condition; a capacitor and means connecting said capacitor for supplying said D. C. potential, a charging circuit connecting to said source of alternating control potential for normally charging said capacitor; means terminating said charging in a predetermined timed relationship with the placement of an energizing potential onto said phase shift circuit.

References Cited in the file of this patent
UNITED STATES PATENTS

| | | |
|---|---|---|
| 2,228,843 | Palmer | Jan. 14, 1941 |
| 2,228,844 | Palmer | Jan. 14, 1941 |
| 2,314,691 | Dawson | Mar. 23, 1943 |
| 2,315,916 | Whiteley | Apr. 6, 1943 |
| 2,327,268 | Jenks | Aug. 17, 1943 |
| 2,390,982 | Bivens | Dec. 18, 1945 |
| 2,401,780 | Undy | June 11, 1946 |
| 2,443,660 | Large | June 22, 1948 |
| 2,474,886 | Bovey | July 5, 1949 |
| 2,477,211 | Smith | July 26, 1949 |
| 2,590,582 | Stadum | Mar. 25, 1952 |